May 19, 1925.

A. FRANCIS

CONTAINER FOR PERFUMES, ETC

Filed April 7, 1923

1,538,631

Inventor
Annie Francis

By Whittemore Hulbert Whittemore
  Belknap         Attorneys

Patented May 19, 1925.

1,538,631

UNITED STATES PATENT OFFICE.

ANNIE FRANCIS, OF DETROIT, MICHIGAN, ASSIGNOR TO FREDERICK STEARNS & COMPANY, OF DETROIT, MICHIGAN, A CORPORATION OF MICHIGAN.

CONTAINER FOR PERFUMES, ETC.

Application filed April 7, 1923. Serial No. 630,606.

*To all whom it may concern:*

Be it known that I, ANNIE FRANCIS, a citizen of the United States of America, residing at Detroit, in the county of Wayne and State of Michigan, have invented certain new and useful Improvements in Containers for Perfumes, Etc., of which the following is a specification, reference being had therein to the accompanying drawings.

The invention relates to containers more particularly designed for use in holding perfumes, and it is the object of the invention to obtain a construction of novel and attractive form.

Figure 1:
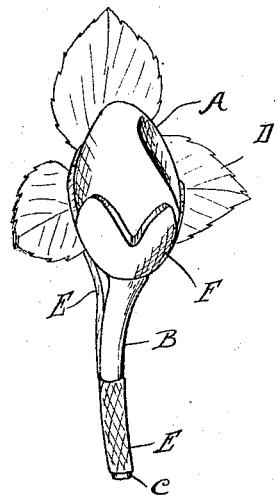
Figure 1 is a perspective view.
Figure 2:
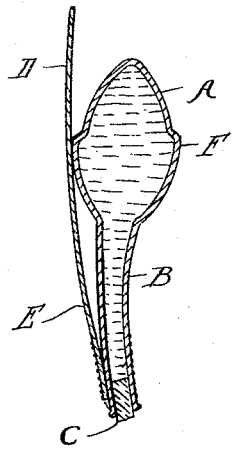
Figure 2 is a central longitudinal section.

My improvement consists essentially in a glass vial or container A which is in the form of a bud or flower having a hollow stem B extending therefrom with a cork or stopper C at its end. Attached to this vial are leaves D, which may be of any suitable construction such as used with artificial flowers. As specifically shown, these leaves are secured to a wire stem E, which latter is arranged on the under side of the stem B and is secured thereto in any suitable way. Thus the device as a whole has the appearance of a natural flower.

As specifically shown, the bulbular portion of the vial A is fashioned with embossed portions F which simulate the opening petals of a rose bud or other flower. The stem B is also of bent and tapering form to simulate the natural stem of the flower. Thus an attractive package is formed without in any way interfering with its utility, as the contents are accessible by withdrawing the cork.

What I claim as my invention is:

1. A container for perfumes, etc., comprising a vial having a bulbular portion fashioned to simulate the petals of a flower and provided with a depending hollow stem communicating with the bulbular portion in combination with leaves attached to project radially from the bulbular portion.

2. A container comprising a vial having a bulbular portion in the form of a bud embossed to simulate the opening petals of a flower, said bulbular portion having a depending hollow stem simulating the stem of the flower, and leaves attached to project radially from said bulbular portion.

3. A container comprising a vial having a bulbular portion simulating a bud and provided with a depending hollow stem with a closure at its end, and a plurality of leaves attached to a common stem which is attached to said tubular stem, said leaves projecting radially from said bulbular portion.

4. A container comprising a vial having a bulbular portion in the form of a bud of a flower, said bulbular portion having a hollow depending stem simulating the stem of the flower and leaves attached to said stem.

In testimony whereof I affix my signature.

ANNIE FRANCIS.